(12) United States Patent
Scully (10) Patent No.: US 8,954,240 B2
(45) Date of Patent: *Feb. 10, 2015

(54) ACTIVE SUSPENSION SEAT AND VEHICLE OPERATION INTERLOCKS

(71) Applicant: Bose Corporation, Framingham, MA (US)

(72) Inventor: Linda Scully, Dunstable, MA (US)

(73) Assignee: Bose Corporation, Framingham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/257,153

(22) Filed: Apr. 21, 2014

(65) Prior Publication Data

US 2014/0225408 A1 Aug. 14, 2014

Related U.S. Application Data

(63) Continuation of application No. 13/448,528, filed on Apr. 17, 2012, now Pat. No. 8,744,694.

(51) Int. Cl.
| | |
|---|---|
| *G06F 17/00* | (2006.01) |
| *B60D 1/28* | (2006.01) |
| *G06F 19/00* | (2011.01) |
| *A47C 3/00* | (2006.01) |
| *B60N 2/02* | (2006.01) |
| *B60N 2/14* | (2006.01) |
| *B60N 2/50* | (2006.01) |

(52) U.S. Cl.
CPC .............. *B60N 2/0244* (2013.01); *B60N 2/146* (2013.01); *B60N 2/501* (2013.01); *B60N 2/502* (2013.01); *B60N 2/0252* (2013.01); *B60N 2/14* (2013.01); *B60N 2002/0264* (2013.01)
USPC .................. 701/49; 297/1; 180/271

(58) Field of Classification Search
USPC .......... 701/1, 36, 37, 39, 45, 49, 67, 70, 29.1, 701/29.2, 32.7, 33.7, 33.8, 33.9; 340/438, 340/439; 297/311, 330, 331, 332, 333; 180/271, 272
See application file for complete search history.

(56) References Cited

U.S. PATENT DOCUMENTS

| | | | |
|---|---|---|---|
| 4,600,239 | A | 7/1986 | Gerstein et al. |
| 4,775,939 | A | 10/1988 | Nakashima et al. |
| 6,059,253 | A | 5/2000 | Koutsky et al. |
| 7,009,488 | B2 | 3/2006 | Schwartz et al. |
| 7,059,680 | B2 | 6/2006 | Billger et al. |
| 8,744,694 | B2 * | 6/2014 | Ystueta ........................ 701/49 |
| 2005/0073184 | A1 | 4/2005 | Tsuji et al. |
| 2006/0237885 | A1 | 10/2006 | Paillard et al. |
| 2010/0127844 | A1 | 5/2010 | Chen |

FOREIGN PATENT DOCUMENTS

DE 102009033802 A1 9/2010

OTHER PUBLICATIONS

International Search Report and Written Opinion dated Jul. 18, 2013 for PCT/US2013/036318.

* cited by examiner

*Primary Examiner* — Thomas Tarcza
*Assistant Examiner* — Edward Pipala
(74) *Attorney, Agent, or Firm* — Brian M. Dingman; Dingman, McInnes & McLane, LLP (57) ABSTRACT

An active suspension seat for use in a vehicle incorporates a swivel enabling the active suspension seat to be rotated about a vertical axis towards and away from a position appropriate for use in driving the vehicle, and incorporates a seat controller operating a brake to prevent such rotation away from that appropriate position in response to an indication that the vehicle is in motion, and limiting the active suspension to being enabled only when the seat is in the appropriate position for use in driving.

20 Claims, 4 Drawing Sheets

ACTIVE SUSPENSION SEAT AND VEHICLE OPERATION INTERLOCKS

CROSS-REFERENCE TO RELATED APPLICATION

This application is a continuation of and claims benefit of application Ser. No. 13/448,528 filed on Apr. 17, 2012, the disclosure of which is incorporated herein in its entirety.

TECHNICAL FIELD

This disclosure relates to the mounting, selective rotation and selective provision of active suspension in an actively suspended vehicle seat.

BACKGROUND

Suspended seats employing active suspension in vehicles increase driver comfort by dampening jolts felt by the driver along one or more axes as the vehicle travels. In so doing, active suspension seats have been known to provide health and safety benefits to drivers, including reduction in driver fatigue over long hours of vehicle operation. Such seats do this by isolating uncomfortable movement of the vehicle from the seat such that the seat is actively caused to move along one or more axes (usually, at least along the vertical axis) relative to the floor (or some other portion of structure) of the vehicle.

Many larger vehicles have a driver's seat that rotates or "swivels" relative to the floor of the interior of the vehicle to allow the driver to sit in the seat in an orientation that faces more towards the interior of the vehicle than is normal while sitting in the seat in an orientation that puts in a position appropriate for it to be used while driving the vehicle (usually facing towards the front of the vehicle). However, the ability of the driver's seat to be so rotated presents the safety concern of the seat being rotated away from an orientation appropriate for driving (or rotated at all) while the vehicle is in motion, possibly interrupting the ability of the driver to drive the vehicle.

SUMMARY

An active suspension seat for use in a vehicle incorporates a swivel enabling the active suspension seat to be rotated about a vertical axis towards and away from a position appropriate for use in driving the vehicle, and incorporates a seat controller operating a brake to prevent such rotation away from that appropriate position in response to an indication that the vehicle is in motion, and limiting the active suspension to being enabled only when the seat is in the appropriate position for use in driving.

In one aspect, a seat includes a swivel enabling the seat to be rotated towards and away from an appropriate position for the seat to be used by a person when driving a vehicle, a brake, and a seat controller coupled to the brake to cause the brake to prevent the seat from being rotated away from the appropriate position in response to receiving an indication that the vehicle is in motion.

The seat may be an active suspension seat that further includes at least one actuator coupled to the seat controller and operated by the seat controller to actively suspend the seat to isolate the seat from a jolt along at least one axis. The axis may be a vertical axis, the swivel may enable the seat to be rotated about the vertical axis, and the swivel may be interposed between a floor of the vehicle and the at least one actuator. The seat controller may cease to operate the at least one actuator to actively suspend the seat in response to the seat being rotated away from the appropriate position.

In another aspect, a method includes awaiting an indication that a vehicle is in motion; and in response to receiving the indication, operating a brake of an active suspension seat to prevent the seat from rotating on a swivel of the seat away from an appropriate position for use of the seat while driving the vehicle.

The method may further include monitoring a sensor to detect whether the seat is currently in the appropriate position for use in driving, and in response to receiving the indication and detecting that the seat is not currently in the appropriate position for use in driving: 1) disabling provision of active suspension by the seat by ceasing to operate at least one actuator employed in providing active suspension, 2) operating a component of a user interface to provide one of a set of alerts consisting of an audible alert that the seat is not in the appropriate position and a visual alert that the seat is not in the appropriate position, and/or 3) operating a network interface to signal a component of the vehicle to provide one of a set of alerts consisting of an audible alert that the seat is not in the appropriate position and a visual alert that the seat is not in the appropriate position. The method may further include monitoring a sensor to detect whether the seat is currently in the appropriate position for use in driving; operating a network interface to monitor a network of the vehicle for data from a component of the vehicle indicative of a manually-operable control of the vehicle being operated to cause the vehicle to be in motion; and in response to receiving data indicative of a manually-operable control of the vehicle being operated to cause the vehicle to be in motion and detecting that the seat is not currently in the appropriate position for use in driving, operating the network interface to signal a component of the vehicle to act to prevent the vehicle from being caused to be in motion.

In still another aspect, an apparatus includes: a swivel enabling the apparatus to be rotated towards and away from an appropriate position for the apparatus to be positioned during travel of a vehicle; at least one actuator; and a controller coupled to the at least one actuator to provide active suspension of a plant supported by the apparatus during travel of the vehicle to isolate the plant from a jolt along at least one axis arising from travel of the vehicle while the apparatus is rotated towards the appropriate position and to cease to provide active suspension while the apparatus is rotated away from the appropriate position.

The axis may be a vertical axis; the swivel may enable the apparatus to be rotated about the vertical axis; and the swivel may be interposed between a floor of the vehicle and the at least one actuator. The apparatus further include a brake, and the controller may be coupled to the brake to cause the brake to prevent the apparatus from being rotated away from the appropriate position in response to receiving an indication of the vehicle being in motion.

Other features and advantages of the invention will be apparent from the description and claims that follow.

DESCRIPTION OF THE DRAWINGS

FIG. 3 is a cross-sectional view of portions of an embodiment of a swivel of the seat of FIG. 1a.

DETAILED DESCRIPTION

It should be noted that although the following discussion and accompanying figures center on implementations of a plant suspension system in which the overall plant includes a physical plant implemented as an actively suspended seat in which a person sits, what is disclosed in that discussion is also applicable to other implementations of plant suspension systems. As those skilled in the art will readily recognize, it is conceivable that there is a need to actively suspend things other than a seat in a vehicle in a manner that allows swiveling or other movement when the vehicle is not in motion, while acting to prevent such movement when the vehicle is in motion; and that provides active suspension while those things are in an appropriate position for vehicle movement, while disabling such active suspension while those things are not in that appropriate position. Such other possible forms of actively suspended plant include, and are not limited to, a suspended portion of a trailer floor of a tractor trailer truck, a suspended shelf in a delivery truck, a suspended cabinet in a recreational vehicle, and a suspended pool table on board a sea vessel. Still other possible implementations of actively suspended plant to which what is disclosed herein is applicable will be clear to those skilled in the art.

It should also be noted that although this discussion centers on suspension systems addressing jolts along substantially horizontal and/or vertical axes and/or planes, this should not be construed as a directional limitation. What is disclosed and claimed herein may be applied to suspension systems configured to address jolts occurring in any given direction, including in rotational directions, and may be applied regardless of how directions of movement are described (e.g., with reference to Cartesian, polar or other coordinate systems). Further, directional terms such as "horizontal" and "vertical" are meant to provide a form of shorthand description for structures that are substantially horizontal or vertical at a time when a vehicle is substantially level with the Earth or substantially plumb, and should not be taken as imposing a requirement of being precisely horizontal or vertical, or a requirement of remaining horizontal or vertical at all times. As those skilled in the art will readily recognize, it is not uncommon for portions of a vehicle that are oriented substantially horizontally or vertically while the vehicle is substantially level with the Earth or substantially plumb (and therefore are referred to as "horizontal" or "vertical" for ease of discussion) to cease to actually be precisely horizontal or vertical as the vehicle is operated to climb or descend inclines, or to be otherwise positioned so as to no longer be level with the Earth or substantially plumb. This same understanding also applies to other directional terms such as "upward," "downward," "forwardly" and "rearwardly."

Figure 1A:
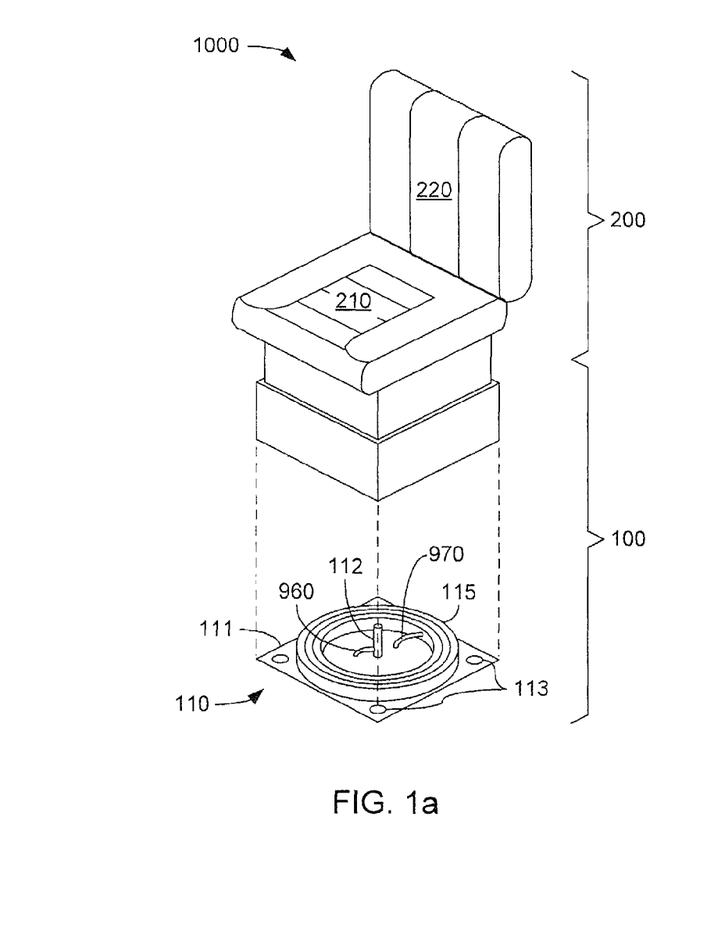
FIG. 1*a* is a perspective view of an active suspension seat.
Figure 1B:
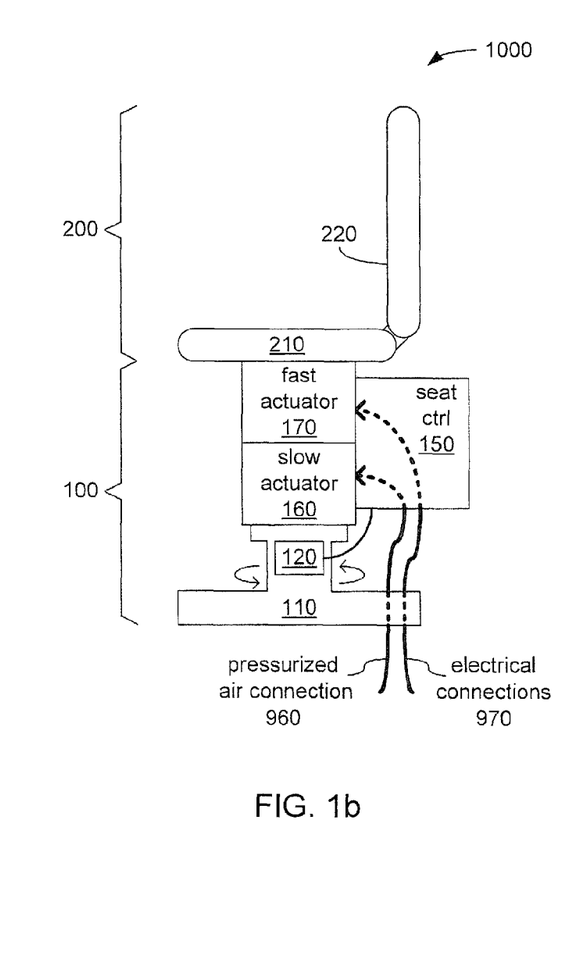
FIG. 1*b* is a high-level block diagram of components of the seat of FIG. 1*a*.
Figure 1C:
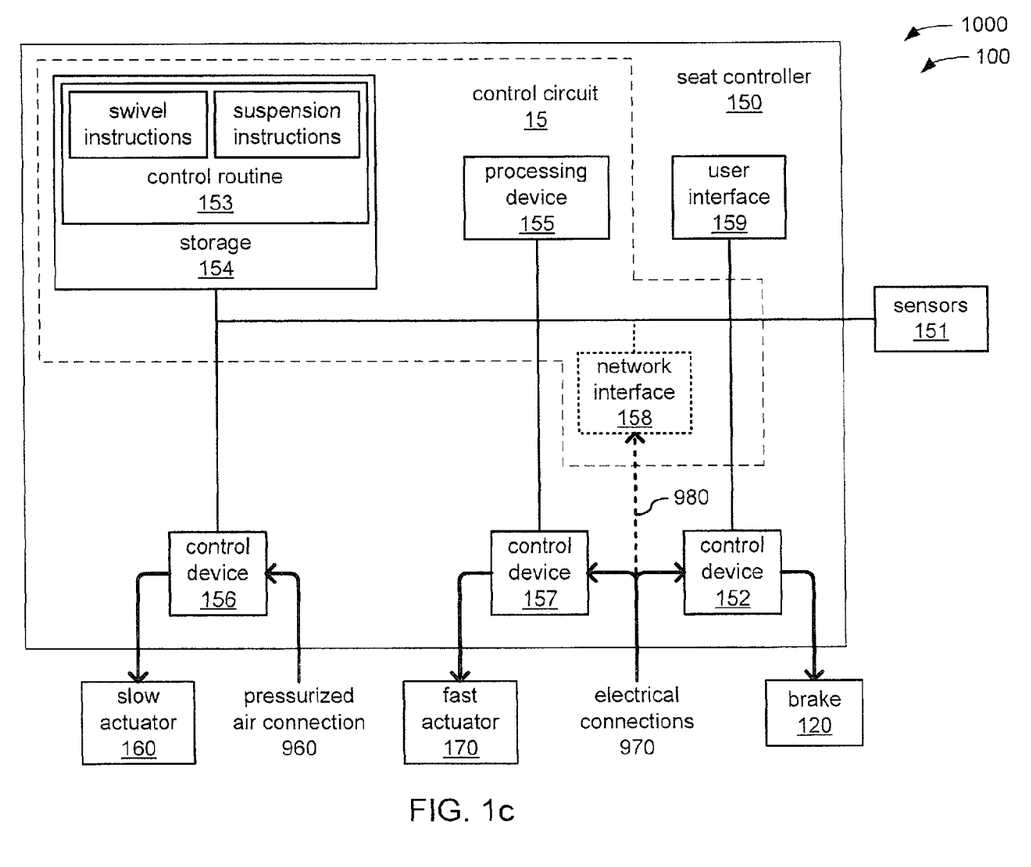
FIG. 1*c* is a low-level block diagram of components of the seat of FIG. 1*a*.

FIG. 1a is a perspective view of an active suspension seat 1000, FIG. 1b is a block diagram of the active suspension seat 1000 showing portions in somewhat greater detail, and FIG. 1c is a block diagram of one possible implementation of a seat controller of the active suspension seat 1000. The active suspension seat 1000 incorporates a base 100 to attach the active suspension seat 1000 to the floor of an interior of a cab of a vehicle (i.e., an interior of a vehicle compartment in which people ride in that vehicle), and a top 200 upon which a user of the active suspension seat 1000 sits. The base 100 is made up of a swivel 110, a brake 120, a seat controller 150, and one or more actuators providing active suspension. In this particular depicted example, the active suspension seat 1000 incorporates both a slow actuator 160 and a fast actuator 170 providing active suspension along the same axis. The top is made up principally of a seat cushion 210 and a back cushion 220.

FIGS. 1a, 1b and 1c are somewhat simplified in their presentation of the active suspension seat 1000. For example, it is expected that the top 200 would also incorporate some seat belt(s), armrest(s), a headrest and/or airbags in addition to the two depicted basic cushions 210 and 220. However, such details are outside the scope of the present application. Also for example, and as will be discussed in detail, the only actuators that are specifically depicted and discussed herein are actuators providing active suspension along a vertical axis and a braking mechanism. This is done for the sake of simplicity in the discussion that follows, and is not meant to suggest that embodiments that incorporate actuators acting in a horizontal and/or still another direction to provide active suspension in a horizontal and/or other direction are not also possible. Indeed, it is preferred that the active suspension seat 1000 has at least passive suspension in a horizontal plane (i.e., has at least a set of springs and/or cushioning air cylinders acting horizontally front-to-back and side-to-side).

Turning to FIG. 1a, the swivel 110 is meant to be the component of the base 100 by which the active suspension seat 1000 is attached to the floor of an interior of a vehicle. The specific mechanism of attachment to the floor (e.g., threaded bolts, welding joints, etc.) is outside the scope of the present application. However, in the particular implementation of the swivel that is depicted, a floor plate 111 of the swivel 110 is provided with apertures 113 through which bolts or other fasteners may be inserted to attach the swivel 110 to a floor. The swivel 110 is meant to enable rotation of the active suspension seat 1000 about a vertical axis (i.e., an axis generally parallel with the direction of the pull of gravity). It is envisioned that the active suspension seat 1000 is to be installed within a cab in a vehicle that has sufficient room to accommodate having a combination of a chair and a person sitting thereupon that rotates about a substantially vertical axis. The swivel 110 may be implemented in any of a variety of ways, including and not limited to, a slip ring, a rotary bearing, a set of wheels or casters rolling on a flat surface around a pivot point, and/or a tube-in-tube slip fitting. However, in the particular implementation of the swivel that is depicted, both a tube-in-tube slip fitting 112 and a slip ring 115 that are mounted to an upwardly-facing surface of the floor plate 111 are employed, and these features of this one possible implementation will be explained in greater detail.

Turning to FIG. 1b, the seat controller 150 is coupled to the brake 120, the slow actuator 160 and the fast actuator 170 to control the manner in which each performs its respective function(s). The vehicle provides the seat controller 150 with electric power through electrical connections 970 and perhaps also pressurized air (or possibly, some other gas) through a pressurized air connection 960 with the vehicle. The seat controller 150 may also be coupled to an internal wired network of the vehicle to enable the seat controller 150 to at least receive information concerning the operation of other components of the vehicle, including information indicative of whether the vehicle is in motion, or not, possibly also through the electrical connections 970. The electric power, the pressurized air (if provided) and/or wired network connection (if provided) are conveyed to the seat controller 150 through and/or around components of the swivel 110, as will be explained in greater detail.

The brake 120 interacts with the swivel 110 and under the control of the seat controller 150 to prevent the rotation enabled by the swivel 110, at least when the vehicle into which the active suspension seat 1000 has been installed is in motion. The brake 120 may be implemented in any of a variety of ways, including and not limited to, disc or drum configurations employing mechanical friction or magnetism.

The slow actuator 160 and the fast actuator 170, together, couple the swivel 110 of the base 100 to the top 200. The slow actuator 160 serves, at least, to raise or lower the top 200 relative to the floor of the vehicle interior, as desired by a user of the active suspension seat 1000. The fast actuator 170 serves to provide active suspension in a vertical (or substantially vertical) direction of the top 200 and the user sitting thereupon (together, the top 200 and the user sitting upon it make up what is usually referred to as the "plant" that is being suspended) relative to the floor of the vehicle interior.

In embodiments where only electric power is provided to the seat controller 150 by the vehicle, all three of the brake, the slow actuator 160 and the fast actuator 170 may be electrically operated actuators (e.g., the brake 120 may be a solenoid, the slow actuator 160 may be a rotary motor, and the fast actuator 170 may be a linear motor), with the seat controller 150 using the provided electric power to operate all three. In embodiments where both electric power and pressurized air (or other gas) is provided to the seat controller 150 by the vehicle, the brake 120 and the slow actuator 160 may be pneumatic cylinders operated by the seat controller 150 with the provided pressurized air, and the fast actuator 170 may be a linear motor operated by the seat controller 150 with the provided electric power.

It is envisioned that the slow actuator 160 is likely to be selected based on its ability to maintain the top 200 and whatever user who sits thereupon at a given default distance from the floor of the vehicle interior without a continuous expenditure of energy of some form provided by the vehicle (e.g., electric power, pressurized air, etc.). Thus, it is envisioned that the technology on which the slow actuator 160 is based is likely to be selected to be advantageous to use as a mechanism for holding the top 200 at a desired height from the floor as selected by a user through operation of manually-operable controls (not shown) providing input to the suspension control 150 of that desired height. In some embodiments, the slow actuator 160 is implemented as an airbag or other form of pneumatic spring. Such a variant of the slow actuator 160 provides both vertical height adjustment and an active suspension component able to function as a variable spring employing the compressibility of air (or other gas) to provide suspension along a vertical axis that addresses at least some lower frequency forces acting along that axis without requiring the active addition or release of air. Thus, the variable spring behavior of such a variant of the slow actuator 160 would enable addressing such lower frequency forces without the expenditure of electrical or other energy drawn from a vehicle (or at least with much more infrequent expenditure of such energy).

It is envisioned that the fast actuator 170 is likely to be selected based on its ability to exert rapidly changing amounts of force in rapidly changing directions (i.e., towards and away from the floor of the vehicle interior), and to do so quickly enough to be effective in providing isolation from jolts that are, themselves, of rapidly changing amounts of force in rapidly changing directions (again, towards and away from the floor of the vehicle interior). Thus, it is envisioned that the technology on which the fast actuator 170 is based is likely to be selected to be advantageous to use where such dynamically changing forces must be exerted with minimal delay and with a high degree of controllability.

The active suspension seat 1000 requires considerable structural stiffness in the base 100 and a strong attachment to a vehicle floor that will withstand the forces generated by the actuators of the active suspension seat 1000 driving the combined mass of the top 200 and the user sitting thereupon (i.e., the total mass of the plant) towards and away from that floor (as well as being able to withstand forces generated by other actuators that may be present in other embodiments to provide active suspension in other dimensions such that this combined mass is also moved in other directions relative to the floor). In other words, the provision of active vertical suspension of this plant will generate considerable forces tending to either push and pull the active suspension seat 1000 into and away from the vehicle floor at different times, and that these different forces will be acting in these different directions in rapid succession. Further, the combined mass of all of the active suspension seat 1000 and its user in a configuration extending upwards from the floor for a considerable distance will tend to exert considerable torque on the attachment of the active suspension seat 1000 to the floor as the vehicle speeds up, slows down and turns.

Among the components of the base 100 that must be built with considerable structural stiffness is the swivel 110. In other words, the swivel 110 must be capable of allowing rotation of the active suspension seat 1000 about a vertical axis (while the vehicle into which it is installed is not moving), while not allowing such an amount of "play" in its design as to allow the active suspension seat 1000 to bend or otherwise move in still other directions relative to the floor so as to cause the seat controller 150 to falsely perceive vehicular movement such that the seat controller 150 operates one or both of the slow actuator 160 or the fast actuator 170 in response. It is preferred that the swivel 110, as well as other structure of the active suspension seat 1000, be sufficiently stiff as to shift the bending modal frequencies at which undesired movement occurs above the frequencies at which either the slow actuator 160 or the fast actuator 170 are operated to provide active suspension. As those skilled in the art will readily recognize, allowing unwanted bending modes to occur within the range of frequencies in which the actuator are operated introduces a noise input into the closed-loop control system that could cause instability leading to undesired operation of actuators. Such a requirement for such stiffness in the swivel 110 likely requires that the swivel 110 be of a relatively large and heavy assembly of hardware.

It is conceivable that the components of the base 100 that are depicted in FIG. 1b could be rearranged such that the swivel 110 is interposed between the top 200 and both of the slow actuator 160 and the fast actuator 170. However, this would add the mass of the swivel 110 and the brake 120 to the plant, which already necessarily includes the combined mass of the top 200 and the user of the active suspension seat 1000. Although such a location for the swivel 110 may allow it to be less heavily built (since it would not need to support as much of the total mass of the active suspension seat 1000 such that the forces exerted on it would be less), the swivel 110 would still need to be at least somewhat heavily built to have sufficient stiffness to still avoid having an amount of "play" occurring within the range of frequencies in which the slow actuator 160 and the fast actuator 170 are operated such that instability would result. The mass of the swivel 110 and the brake 120 being added to what is suspended would also require stronger versions of the slow actuator 160 and the fast actuator 170 to both support all of the additional weight and to move the additional mass towards and away from a vehicle floor as part of providing vertical active suspension. The use of stronger versions of these actuators acting would, in turn, require more energy to be supplied by the vehicle (i.e., an increase in the amount of electric power and/or pressurized air being provided). Thus, it is preferred that the components of the base 100 be arranged such that both of the slow actuator 160 and the fast actuator 170 are interposed between the top 200 and the swivel 110, as has been depicted and earlier discussed.

Turning to FIG. 1c, this specific depicted implementation of the seat controller 150 is made up of a control circuit 15; control devices 152, 156 and 157; and a user interface 159, and is coupled to sensor 151. The control circuit 15, incorporates a processing device 155 and a storage 154 that is accessible to the processing device 155 and stores a control routine 153 that the processing device 155 accesses to execute sequences of instructions thereof. The processing device 155 is coupled to the other components of the seat controller 150, as well as to the sensors 151, through one or more buses enabling the processing device 155 to at least retrieve data from and/or output control signals to each of these components. The execution of instructions of the control routine 153 by the processing device 155 causes the processing device 155 to access various ones of these other components to provide active suspension while the suspension seat 1000 is rotated about a vertical axis into an appropriate position during vehicular motion, disable active suspension (i.e., cease provision of active suspension) while the suspension seat 1000 is rotated away from the appropriate position, and to prevent the active suspension seat 1000 from being rotated away from the appropriate position during vehicular motion.

The sensors 151 are made up of at least one or more position sensors and/or accelerometers that detect the current position of at least the top 200 relative to a floor and/or sense accelerations imparted to the active suspension seat 1000 and/or the vehicle into which the active suspension seat 1000 has been installed. The processing device 155 is caused by its execution of the control routine 153 to monitor the sensors 151 to retrieve data concerning details of these positions and/or accelerations, this data serving as the primary input in the provision of active suspension. In addition to the sensors 151, the processing device 155 also monitors one or manually-operable controls of the user interface 159 that are operable by a user of the active suspension seat 1000 to allow that user to specify the desired height of the top 200 from a vehicle floor. The control devices 156 and 157 are operable by the processing device 155 to cause the slow actuator 160 and the fast actuator 170, respectively, to exert forces in directions along a substantially vertical axis to provide such vertical level adjustment and vertical active suspension of the top 200 and the user sitting thereupon. Depending on whether each of the actuators 160 and 170 are electrically or pneumatically powered, the control devices 156 and 157 may each incorporate amplifiers, power switching devices, valves, etc. In providing vertical active suspension, the processing device 155 is caused to operate the sensors 151 and the control devices 156 and 157 in a manner forming a feedback loop as part of employing one or more active suspension algorithms that will be familiar to those skilled in the art, and that are beyond the scope of this present application.

The sensors 151 are also made up of at least one mechanical, optical, magnetic or other form of orientation sensor incorporated into the swivel 110 to at least detect whether or not the active suspension seat 1000 is currently rotated into a position appropriate for use in driving the vehicle into which the active suspension seat 1000 is installed. The processing device 155 is caused by its execution of the control routine 153 to monitor this at least one of the sensors 151 confirm that the active suspension seat is in that appropriate position.

The control device 152 is operable by the processing device 155 to cause the brake 120 to restrain the active suspension seat 1000 from rotating at the swivel 110 about a vertical axis out of a position appropriate for use by a person driving the vehicle into which the active suspension seat 1000 is installed. As in the case of the control devices 156 and 157, depending on whether the brake 120 is electrically or pneumatically powered, the control device 152 may incorporate any of a number of possible components for controlling the provision of electricity or pressurized air (or other gas) to the brake 120. In support of such operation of the control device 152 to cause such activity by the brake 120, the processing device 155 requires indications of whether or not the vehicle into which the active suspension seat 1000 has been installed is in motion. The processing device 155 is caused to receive such indications from one or both of the sensors 151 or the network interface 185 (if present). In some embodiments, the processing device 155 monitors at least one of the sensors 151 (probably one that is incorporated into a portion of the base 100 that is fixed to the floor) for acceleration(s) that are consistent with the vehicle moving versus the vehicle remaining stationary. In doing this, various analysis techniques may be employed to distinguish detected accelerations that are indicative of just the active suspension seat 1000 being moved (likely as a result of a user sitting down, getting up or otherwise moving about while sitting thereupon) from detected accelerations that are indicative of the whole vehicle moving.

In other embodiments, where the seat controller 150 incorporates the network interface 158 and where a wired network 980 of a vehicle has been coupled (as part of the electrical connections 970) to the network interface 158, the processing device 155 operates the network interface 158 to monitor activity on the wired network 980 for indications of how one or more components of the vehicle are being operated. Thus, depending on what components of the vehicle are coupled to that network and what status information they provide on that network, the seat controller 150 (i.e., the processing device 155 through the network interface 158) may monitor the operation of the transmission lever 955, or a sensor coupled to one of the wheels of the vehicle indicating a rate of rotation of that wheel (i.e., revolutions per minute of that wheel, possibly employed to determined the miles or kilometers per hour at which the vehicle is moving), or a sensor coupled to an engine of the vehicle indicating a rate of rotation of a component of that engine. Therefore, it may be that the processing device 155 operates the control device 152 to cause operation of the brake 120 to prevent the active suspension seat 1000 from being rotated out of a position appropriate for use by a user driving the vehicle into which the active suspension seat 1000 has been installed in response to receiving an indication of one or more of the transmission lever 956 being operated out of a "park" setting and into a gear for moving forwards or backwards, or the sensor coupled to a wheel indicating a non-zero value for revolutions per minute, or the sensor coupled to a component of that engine indicating a higher value for revolutions per minute that is more consistent with the vehicle being moved under the power of that engine than with that engine idling such that the vehicle is at least likely to be stationary.

In still other embodiments, the user interface 159 may incorporate a buzzer (or other form of acoustic driver) and/or one or more visual indicators (e.g., lights, text display, etc.) by which information may audibly and/or visually be communicated to a user of the active suspension seat 1000. In such embodiments, the processing device 155 may be further caused by the control routine 153 to operate such a form of the user interface 159 to provide an audible and/or visible alert in response to an indication of vehicular motion commencing at a time when the active suspension seat 1000 is already rotated to a position other than the forward facing position of FIG. 2a (e.g., already rotated to the position depicted in FIG. 2b, or other position that is not appropriate for use by someone who is driving, at the onset of vehicular motion).

In addition to these interlocks in which the active suspension seat 1000 is either prevented from being rotated out of an appropriate position for driving in response to movement, or in which some alert is presented if vehicle movement is detected when the active suspension seat 1000 is already rotated out of that appropriate position, the processing device 155 may be caused by execution of the control routine 153 to effect another interlock in which operation of actuators to provide active suspension is suspended whenever the active suspension seat 1000 is rotated out of the appropriate position. The processing device 155 may again rely on monitoring an orientation sensor among the sensors 151 for an indication of whether the active suspension seat 1000 has been rotated on the swivel 110 into or out of an appropriate position for use in driving a vehicle.

With these interlocks in place, the active suspension seat 1000 is given two distinct modes: an operation mode in which the active suspension seat is rotated into a position appropriate for a user to sit thereupon and drive a vehicle, while getting the benefits of active suspension, and from which the active suspension seat 1000 is not able to be rotated away as long as the vehicle is in motion; and a non-operation mode in which the active suspension seat is rotated out of the position appropriate for use in driving, where active suspension is disabled (i.e., actuators cease to be operated to provide active suspension) to conserve energy, and where an alert is audibly or visually presented and/or action is automatically taken to stop or prevent vehicle movement if vehicle movement (or preparation for movement of the vehicle) is detected while the active suspension seat 1000 remains rotated away from the appropriate position.

Figure 2A:
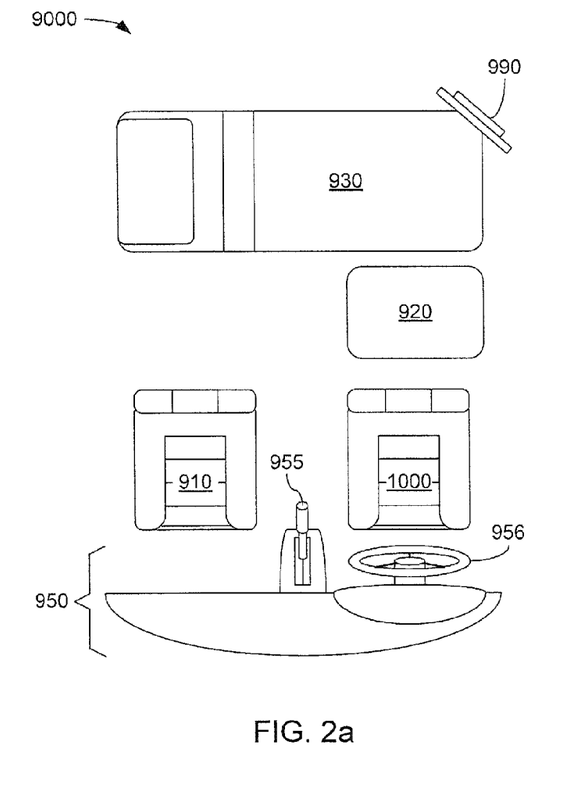
FIGS. 2*a* and 2*b* are overhead views of portions of an interior of a vehicle depicting an extent of swiveling of the seat of FIG. 1*a* relative to that interior.
Figure 2B:
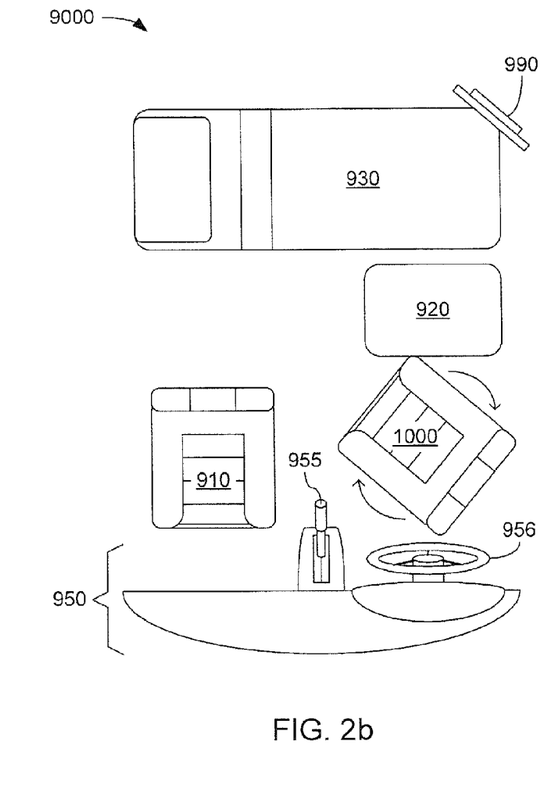

FIGS. 2a and 2b, together, present a pair of overhead views (i.e., a views from above) of portions of the same interior of the same cab of a land vehicle, specifically portions of the interior of a "sleeper cab" version of a tractor of an "18-wheeler" or tractor-trailer truck. As will be explained in greater detail, FIGS. 2a and 2b differ only in their depiction of positions to which the active suspension seat 1000 of FIGS. 1a-c has been rotated about a substantially vertical axis. These depictions of an interior of a "sleeper cab" are greatly simplified, as they lack any depiction of the location of a windshield or other windows, either driver side or passenger side doors, or walls (including a rear wall, outside of which is where the front end of a trailer may be found). This simplification is to avoid visual clutter in discussing the rotational movements of the active suspension seat 1000 relative to other items that may be inside such a cab.

As depicted, the interior 9000 of the cab incorporates the active suspension seat 1000, a passenger side seat 910, a table 920, a bed 930, a control console 950 and a television 990. In turn, the control console 950 incorporates a transmission lever 955 and a steering wheel 956. As will later be discussed, the passenger side seat 910 may also be an active suspension seat very much like the active suspension seat 1000, but may or may not incorporate all of the same interlocks just discussed as possibly being incorporated into the active suspension seat 1000. It is envisioned that both the table 920 and the bed 930 are likely fixed to vehicle structure that makes up the cab in which the interior 9000 is located, although it is possible that the table 920 may be hinged to allow it to be moved towards one side of the interior 9000 to create more space (e.g., the table 920 may be hinged to fold upwardly against a wall). The television 990 is depicted as being of a flat-panel variety that is installed in a rearward corner of the interior 9000 on a wall-mount bracket attached to one of two walls (not specifically shown) that define that corner so as to be conveniently viewable from the bed 930 or either of the seats 910 or 1000 (presuming both are able to be rotated to face towards the television 990).

The control console 950 is the location of the majority of the manually-operable controls to be employed by a driver to operate this vehicle, the control console 950 being positioned towards the front and under a windshield (not shown). As is conventional in most land vehicles, it is intended that the driver face towards the front of the vehicle while sitting in the active suspension seat 1000 to operate the controls of the control console, including the transmission lever 955 and the steering wheel 956, when the vehicle is moving. Thus, the forward-facing position of the active suspension seat 1000 depicted in FIG. 2a is deemed the appropriate position to which the active suspension seat 1000 should be rotated. In this position, a user of the active suspension seat 1000 who is driving (is about to drive) is positioned with the steering wheel 956 and a portion of the windshield above the steering wheel 956 directly in front of them, as well as also having the transmission lever 955 generally in front of them (though slightly off to one side, as is conventional).

In contrast, FIG. 2b depicts the active suspension seat 1000 rotated away from the forward-facing position of FIG. 2a, and instead, rotated towards more of the rest of the interior 9000. In various possible implementations, the active suspension seat 1000 may be rotatable through at least 180 degrees such that it faces rearwardly towards the table 920 (so as to allow its user sitting thereupon to possibly use the table 920 for eating or writing, or possibly to view the television 990), or the active suspension seat 1000 may be rotatable only through a more limited 90 degrees such that it faces towards the passenger seat 910 (perhaps permitting conversation with someone sitting on the passenger seat 910, or possibly allowing use of the passenger seat 910 as a footstool). Still other variations of limits of the extent of rotation of the active suspension seat 1000 are possible in various implementations.

Again, the seat controller 150 (i.e., the processing device 155 as a result of executing a sequence of instructions of the control routine 153, where the specific implementation of the seat controller 150 depicted in FIG. 1c is used) puts one or more interlocks into place concerning rotation of the active suspension seat 1000. Specifically, the controller 150 may operate the brake 120 to prevent rotation of the active suspension seat 1000 out of the forward-facing position depicted in FIG. 2a in response to receiving an indication that the vehicle into which the active suspension seat 1000 is installed is in motion; and/or, in instances where the active suspension seat 1000 has already been rotated out of the forward-facing position of FIG. 2a (perhaps to the position depicted in FIG. 2b), may provide an audible and/or visible alert to the effect that the active suspension seat 1000 should not be used by someone driving a vehicle while rotated out of that forward-facing position in response to receiving an indication of impending vehicular motion (i.e., that the vehicle has started moving or is about to start moving); and/or in instances where the active suspension seat 1000 has already been rotated out of the forward-facing position of FIG. 2a, disable the provision of active suspension to conserve power (electric and/or pneumatic) provided by the vehicle (based on the assumption that the vehicle's engine(s) are likely not running during much of the time that the vehicle is not moving).

Alternatively or additionally, in embodiments where the seat controller 150 incorporates a network interface (i.e., the network interface 158 operated by the processing device 155, where the specific implementation of the seat controller 150 depicted in FIG. 1c is used) capable of transmitting commands and/or data across a vehicle network (either the wired network 980, or a wireless network), the seat controller 150 may signal a vehicle component to either provide an alert or to possibly act in some way prevent or stop vehicular motion at a time when the active suspension seat 1000 has already been rotated away from an appropriate position for use in driving (e.g., rotated away from the forward-facing position of FIG. 2a). To do this, the seat controller 150 signals a component of the control console 950 to cause a buzzer (or other acoustic driver) and/or a visual indicator of the control counsel 950 to provide an audible and/or visual alert, or the seat controller 150 signals a transmission component to ignore an attempt to change the current gear setting from "park" to a driving gear through operation of the transmission lever 955.

Thus, for example, if the active suspension seat 1000 is rotated away from an appropriate position for driving and the seat controller 150 receives an indication through the wired network 980 that the transmission lever 955 is being operated to select a driving gear, the seat controller 150 may respond to this by signaling through the wired network 980 for a buzzer of the control console 950 to sound an audible alert. Continuing with this example, the seat controller may additionally signal for the manual operation of the transmission lever 955 to select that driving gear to be ignored (such that the transmission receiving inputs from the transmission lever 955 simply refrains from making a change to that gear), for the vehicle's brakes to remain applied (or to be applied, if not already applied) to prevent vehicle movement, and/or for operation of a gas pedal (not shown) to be ignored such that the engine does not change from an idling speed.

Still further, the seat controller 150 may control operation of television 990 (either through the wired network 980 or a wireless communications link with the television 990) such that television operation to view entertainment channels is enabled only when there is no vehicular movement. Depending on where exactly the television 990 is mounted within the cab relative to the active suspension seat 1000, the seat controller 150 may control operation of the television 990 to a further extent to cause it to cease any display of entertainment channels and to display only an image from a camera mounted on the exterior of the vehicle into which the active suspension seat 1000 is installed to provide a view of the area behind the vehicle that may also useable for when the vehicle is being driven rearwardly (i.e., when the vehicle is "hacking up").

Figure 3:
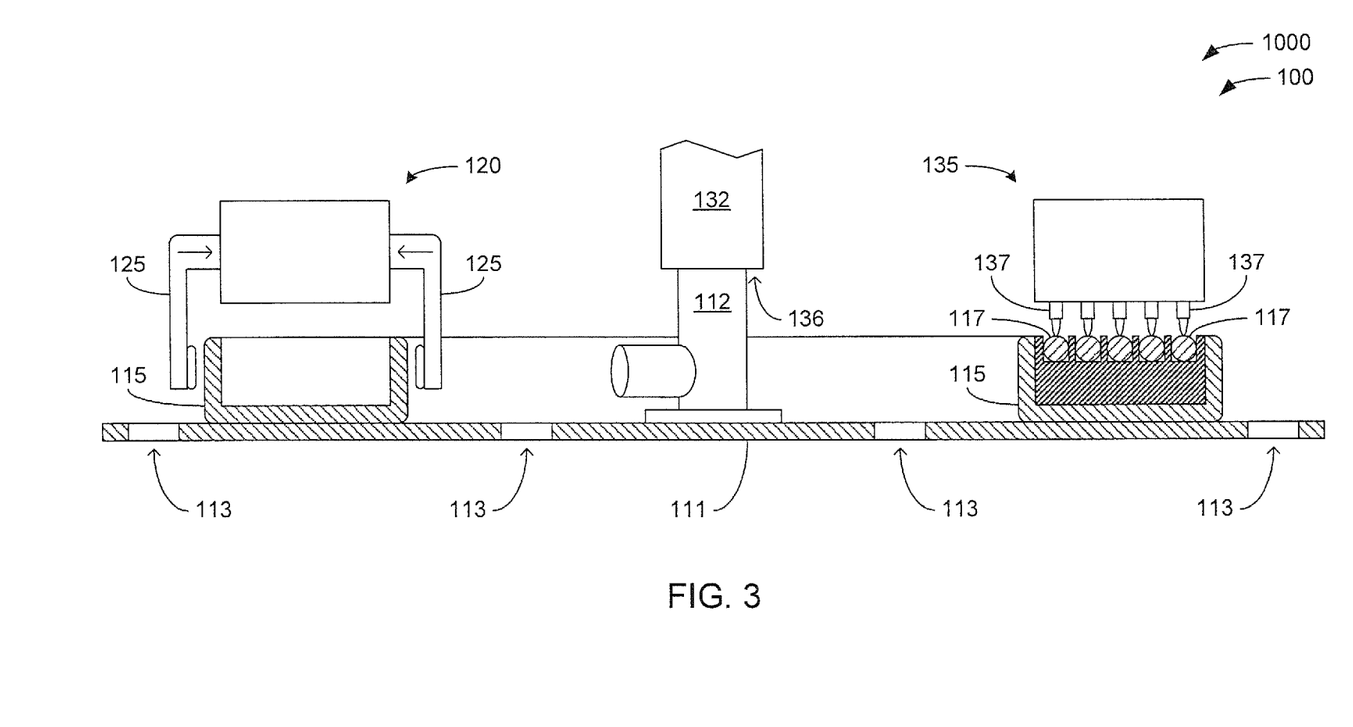

FIG. 3 provides a cross-sectional view of the implementation of the swivel 110 depicted in FIG. 1a. Specifically, a cross-section of the floor plate 111 and slip ring 115 are shown from an "edge-on" perspective relative to the floor plate 111. As previously discussed, the floor plate 111 has multiple apertures 113 formed therethrough, and both the tube-in-tube slip fitting 112 and the slip ring 115 are mounted to an upwardly-facing surface of the floor plate 111. The tube-in-tube slip fitting 112 incorporates a connection point to which the pressurized air connection 960 is able to be connected after being fed through one of the apertures 113. Also depicted in greater detail are a multitude of conductors 117 carried by an insulator within the slip ring, each of these conductors 117 being meant to be electrically coupled to a conductor of the electrical connections 970, which are also to be fed through one of the apertures 113. As can also be seen, the conductors 117 and the insulator in which they are carried need not extend all around the entire circular shape formed by the slip ring 115, as it is expected that the active suspension seat 1000 is unlikely to ever be rotated a full revolution—it is envisioned that the active suspension seat may be rotated 180 degrees, at most, though a greater extent of rotation (e.g., 270 degrees, perhaps to face towards the driver's door) is certainly possible.

The tube-in-tube slip fitting 112 is meant to be engaged by a mating fitting 132 that forms a sufficient seal between these two tubes to allow pressurized air from the pressurized air connection 960 to be conveyed therethrough with little or no leakage. The conductors 117 are engaged by contacts 137 of a contact assembly 135 to allow electric power and/or signals to be conveyed between the electrical connections 970 and portions of the active suspension seat 1000 that are positioned above the swivel 110, such as the seat controller 150. The structure of the slip ring 115, itself, is meant to be engaged by floating arms 125 of the brake 120 (depicting as being a caliper-type brake) under the control of the seat controller 150 to at least prevent the active suspension seat 1000 from being rotated away from a forward-facing position appropriate for use in driving a vehicle (as has been discussed, at length).

This depicted implementation of the swivel 110 enables the continued provision of pressurized air and electric power (and possibly, also a continued coupling to the wired network 980) while the active suspension seat 1000 is rotated through whatever range of motion is allowed for. However, it is worth noting, again, that other very different implementations of the swivel 110 are possible in which pressurized air and/or electric power are conveyed in entirely different ways, including and not limited to, the use of hose and/or electric cabling of sufficient length and routed about the components of the base 100 in such a manner as to allow the active suspension seat 1000 to be rotated through its allowed range of motion.

Other implementations are within the scope of the following claims and other claims to which the applicant may be entitled.

The invention claimed is:

1. An apparatus for actively suspending a seat in a motor vehicle comprising:
    a swivel enabling the seat to be pivoted about a vertical axis towards and away from an appropriate position for the seat to be used by a person when driving a vehicle;
    a brake;
    a controller coupled to the brake to cause the brake to inhibit the seat from being pivoted away from the appropriate position in response to receiving an indication that the vehicle is in motion, and
    at least one controllable actuator coupled to the controller and operated by the controller to actively control motion of the seat in at least one degree of freedom of motion.

2. The apparatus of claim 1, wherein motion of the seat is actively controlled in a rotational degree of freedom.

3. The apparatus of claim 2, wherein:
    the rotational degree of freedom is rotation about a horizontal axis; and
    the swivel is interposed between a floor of the vehicle and the at least one actuator.

4. The apparatus of claim 3, wherein the controller ceases to operate the at least one actuator to actively control motion of the seat in response to the seat being pivoted away from the appropriate position.

5. The apparatus of claim 1, wherein the swivel comprises a slip ring to convey electric power from the vehicle to another portion of the seat.

6. The apparatus of claim 5, wherein the slip ring further conveys a wired network of the vehicle to the seat controller.

7. The apparatus of claim 5, wherein the another portion of the seat is one of a set consisting of the brake and an actuator to actively suspend the seat.

8. The apparatus of claim 1, wherein the swivel comprises a tube-in-tube slip fitting to convey pressurized gas from the vehicle to another portion of the seat.

9. The apparatus of claim 1, wherein:
the seat further comprises an accelerometer carried by a portion of the seat fixed to structure of the vehicle;
the controller comprises a processing device and a storage storing a sequence of instructions executed by the processing device;
wherein the processing device is caused by the sequence of instructions to monitor the accelerometer to detect an acceleration consistent with the vehicle being in motion; and
wherein the indication that the vehicle is in motion is the acceleration consistent with the vehicle being in motion.

10. The apparatus of claim 1, wherein:
the controller comprises a network interface, a processing device, and a storage storing a sequence of instructions executed by the processing device;
wherein the processing device is caused by the sequence of instructions to operate the network interface to monitor a network of the vehicle for data from a component of the vehicle indicative of the vehicle being in motion; and
wherein the indication of the vehicle being in motion is the data from a component of the vehicle indicative of the vehicle being in motion.

11. A method of actively suspending a seat of a motor vehicle comprising:
awaiting an indication that the vehicle is in motion;
in response to receiving the indication, operating a brake of an active suspension seat to prevent the seat from pivoting on a swivel of the seat away from an appropriate position for use of the seat while driving the vehicle, and automatically operating via the controller a controllable actuator that actively controls motion the seat in at least one degree of freedom.

12. The method of actively suspending a seat of claim 11, wherein awaiting the indication comprises monitoring an accelerometer carried by a portion of the seat fixed to structure of the vehicle to detect an acceleration consistent with the vehicle being in motion.

13. The method of actively suspending a seat of claim 11, wherein awaiting the indication comprises operating a network interface of a seat controller of the active suspension seat to monitor a network of the vehicle for data from a component of the vehicle indicative of the vehicle being in motion.

14. The method of actively suspending a seat of claim 11, further comprising:
monitoring a sensor to detect whether the seat is currently in the appropriate position for use in driving; and
in response to receiving the indication and detecting that the seat is not currently in the appropriate position for use in driving, disabling provision of active control of seat motion by ceasing to operate the controllable actuator.

15. The method of actively suspending a seat of claim 11, further comprising:
monitoring a sensor to detect whether the seat is currently in the appropriate position for use in driving; and
in response to receiving the indication and detecting that the seat is not currently in the appropriate position for use in driving, operating a component of a user interface to provide one of a set of alerts consisting of an audible alert that the seat is not in the appropriate position and a visual alert that the seat is not in the appropriate position.

16. The method of actively suspending a seat of claim 11, further comprising:
monitoring a sensor to detect whether the seat is currently in the appropriate position for use in driving; and
in response to receiving the indication and detecting that the seat is not currently in the appropriate position for use in driving, operating a network interface to signal a component of the vehicle to provide one of a set of alerts consisting of an audible alert that the seat is not in the appropriate position and a visual alert that the seat is not in the appropriate position.

17. The method of actively suspending a seat of claim 11, further comprising:
monitoring a sensor to detect whether the seat is currently in the appropriate position for use in driving;
operating a network interface to monitor a network of the vehicle for data from a component of the vehicle indicative of a manually-operable control of the vehicle being operated to cause the vehicle to be in motion; and
in response to receiving data indicative of a manually-operable control of the vehicle being operated to cause the vehicle to be in motion and detecting that the seat is not currently in the appropriate position for use in driving, operating the network interface to signal a component of the vehicle to act to prevent the vehicle from being caused to be in motion.

18. The method of actively suspending a seat of claim 11, further comprising signaling a television carried within the vehicle to refrain from displaying entertainment channels in response to receiving the indication.

19. The method of actively suspending a seat of claim 18, further comprising signaling the television to display an image provided by a camera disposed on the vehicle and providing a view to the rear of the vehicle in response to receiving the indication.

20. The method of actively suspending a seat of claim 11, wherein the one degree of freedom is a rotation about a horizontal axis.

* * * * *